(12) United States Patent
Mattsson

(10) Patent No.: US 8,443,426 B2
(45) Date of Patent: May 14, 2013

(54) METHOD AND SYSTEM FOR PREVENTING IMPERSONATION OF A COMPUTER SYSTEM USER

(75) Inventor: Ulf Mattsson, Stamford, CT (US)

(73) Assignee: Protegrity Corporation, Grand Cayman (KY)

( * ) Notice: Subject to any disclaimer, the term of this patent is extended or adjusted under 35 U.S.C. 154(b) by 0 days.

(21) Appl. No.: 12/451,847

(22) PCT Filed: Jun. 11, 2008

(86) PCT No.: PCT/SE2008/050704
§ 371 (c)(1),
(2), (4) Date: Apr. 5, 2010

(87) PCT Pub. No.: WO2008/153496
PCT Pub. Date: Dec. 18, 2008

(65) Prior Publication Data
US 2010/0192208 A1      Jul. 29, 2010

Related U.S. Application Data

(60) Provisional application No. 60/934,128, filed on Jun. 11, 2007.

(51) Int. Cl.
| | | |
|---|---|---|
| G06F 7/04 | (2006.01) |
| G06F 15/16 | (2006.01) |
| G06F 17/30 | (2006.01) |
| G06F 12/00 | (2006.01) |
| G06F 12/14 | (2006.01) |
| G06F 13/00 | (2006.01) |
| G06F 21/00 | (2006.01) |
| H04L 29/06 | (2006.01) |
| G11C 7/00 | (2006.01) |
| H04N 7/16 | (2011.01) |

(52) U.S. Cl.
USPC ............................................................ 726/6

(58) Field of Classification Search ................. 726/6
See application file for complete search history.

(56) References Cited

U.S. PATENT DOCUMENTS 4,218,582 A    8/1980   Hellman et al.
4,405,829 A    9/1983   Rivest et al.
(Continued)

FOREIGN PATENT DOCUMENTS

EP    0813327        12/1997
EP    0813327 A2    12/1997
(Continued)

OTHER PUBLICATIONS

Giles Brassard and Paul Bratley, "Fundamentals of Algorithms", pp. 160-61 (1996).
(Continued)

Primary Examiner — Carolyn B Kosowski
(74) Attorney, Agent, or Firm — Fenwick & West LLP

(57) ABSTRACT

A system and method for preventing an administrator impersonating a user from accessing sensitive resources on a target system is provided. The method comprises receiving a first request from a user to change the user's password on a target system to be changed, sending a "change password" request for the user to the target system, storing the user's new password, receiving a second request from the target system on behalf of the user for access to a sensitive resource, wherein the second request contains information about the user's password, and denying the second request if the information about the user's password is not consistent with the user's stored new password.

18 Claims, 2 Drawing Sheets

U.S. PATENT DOCUMENTS

| | | | |
|---|---|---|---|
| 4,417,338 A | 11/1983 | Davida | |
| 4,424,414 A | 1/1984 | Hellman et al. | |
| 4,649,233 A | 3/1987 | Bass et al. | |
| 4,819,162 A | 4/1989 | Webb, Jr. et al. | |
| 4,850,017 A | 7/1989 | Matyas, Jr. et al. | |
| 4,876,716 A | 10/1989 | Okamoto | |
| 4,955,082 A | 9/1990 | Hattori et al. | |
| 4,956,769 A | 9/1990 | Smith | |
| 4,995,081 A | 2/1991 | Leighton et al. | |
| 5,136,642 A | 8/1992 | Kawamura et al. | |
| 5,148,481 A | 9/1992 | Abraham et al. | |
| 5,150,411 A | 9/1992 | Maurer | |
| 5,265,221 A | 11/1993 | Miller | |
| 5,268,962 A | 12/1993 | Abadi et al. | |
| 5,271,007 A | 12/1993 | Kurahashi et al. | |
| 5,278,901 A | 1/1994 | Shieh et al. | |
| 5,283,830 A | 2/1994 | Hinsley et al. | |
| 5,343,527 A | 8/1994 | Moore | |
| 5,369,702 A | 11/1994 | Shanton | |
| 5,375,169 A | 12/1994 | Seheidt et al. | |
| 5,392,357 A | 2/1995 | Bulfer et al. | |
| 5,438,508 A | 8/1995 | Wyman | |
| 5,446,903 A | 8/1995 | Abraham et al. | |
| 5,459,860 A | 10/1995 | Burnett et al. | |
| 5,475,762 A * | 12/1995 | Morisawa et al. | 726/18 |
| 5,493,668 A | 2/1996 | Elko et al. | |
| 5,504,814 A | 4/1996 | Miyahara | |
| 5,572,652 A | 11/1996 | Robusto et al. | |
| 5,596,718 A | 1/1997 | Boebert et al. | |
| 5,606,610 A | 2/1997 | Johannsson | |
| 5,646,604 A | 7/1997 | Maruyama et al. | |
| 5,659,614 A | 8/1997 | Bailey, III | |
| 5,661,799 A | 8/1997 | Nagel et al. | |
| 5,680,452 A | 10/1997 | Shanton | |
| 5,699,428 A | 12/1997 | McDonnal et al. | |
| 5,717,755 A | 2/1998 | Shanton | |
| 5,719,941 A | 2/1998 | Swift et al. | |
| 5,734,718 A * | 3/1998 | Prafullchandra | 713/183 |
| 5,751,812 A | 5/1998 | Anderson | |
| 5,751,949 A | 5/1998 | Thomson et al. | |
| 5,757,908 A | 5/1998 | Cooper et al. | |
| 5,768,276 A | 6/1998 | Diachina et al. | |
| 5,771,349 A * | 6/1998 | Picazo et al. | 726/21 |
| 5,850,559 A | 12/1998 | Angelo et al. | |
| 5,881,226 A * | 3/1999 | Veneklase | 726/16 |
| 5,898,781 A | 4/1999 | Shanton | |
| 5,915,017 A | 6/1999 | Sung et al. | |
| 5,915,025 A | 6/1999 | Taguchi et al. | |
| 5,917,915 A | 6/1999 | Hirose | |
| 5,923,843 A | 7/1999 | Vaughan et al. | |
| 5,924,094 A | 7/1999 | Sutter | |
| 5,933,498 A | 8/1999 | Schneck et al. | |
| 5,940,507 A | 8/1999 | Cane et al. | |
| 5,963,642 A | 10/1999 | Goldstein | |
| 6,044,471 A | 3/2000 | Colvin | |
| 6,070,160 A | 5/2000 | Geary | |
| 6,098,172 A | 8/2000 | Coss et al. | |
| 6,133,830 A | 10/2000 | D'Angelo et al. | |
| 6,148,404 A | 11/2000 | Yatsukawa | |
| 6,172,664 B1 | 1/2001 | Nakasuji et al. | |
| 6,173,282 B1 | 1/2001 | McCaughan et al. | |
| 6,209,032 B1 * | 3/2001 | Dutcher et al. | 709/223 |
| 6,237,023 B1 | 5/2001 | Yoshimoto | |
| 6,240,184 B1 * | 5/2001 | Huynh et al. | 380/206 |
| 6,269,405 B1 * | 7/2001 | Dutcher et al. | 709/248 |
| 6,321,201 B1 | 11/2001 | Dahl | |
| 6,332,572 B1 | 12/2001 | Yamamoto et al. | |
| 6,405,318 B1 | 6/2002 | Rowland | |
| 6,427,182 B1 | 7/2002 | Sugiura et al. | |
| 6,496,937 B1 * | 12/2002 | Ichihara | 726/6 |
| 6,510,522 B1 | 1/2003 | Heinrich et al. | |
| 6,594,656 B1 | 7/2003 | Arlein et al. | |
| 6,636,973 B1 | 10/2003 | Novoa et al. | |
| 6,701,439 B1 | 3/2004 | Dunn | |
| 6,701,528 B1 | 3/2004 | Arsenault et al. | |
| 6,728,884 B1 * | 4/2004 | Lim | 726/12 |
| 6,738,913 B1 | 5/2004 | Uchida | |
| 6,748,447 B1 | 6/2004 | Basani et al. | |
| 6,792,545 B2 * | 9/2004 | McCreight et al. | 726/29 |
| 6,816,854 B2 | 11/2004 | Reiner et al. | |
| 6,823,464 B2 * | 11/2004 | Cromer et al. | 726/5 |
| 6,910,135 B1 | 6/2005 | Grainger | |
| 6,938,269 B2 | 8/2005 | Kajimoto | |
| 6,963,980 B1 | 11/2005 | Mattsson | |
| 6,980,989 B2 * | 12/2005 | Silverman et al. | 1/1 |
| 6,981,151 B1 | 12/2005 | Groeneveld et al. | |
| 6,986,038 B1 * | 1/2006 | Leah et al. | 713/155 |
| 7,055,042 B1 * | 5/2006 | Gough et al. | 726/19 |
| 7,111,005 B1 * | 9/2006 | Wessman | 1/1 |
| 7,120,933 B2 | 10/2006 | Mattsson | |
| 7,353,536 B1 * | 4/2008 | Morris et al. | 726/6 |
| 7,409,094 B2 | 8/2008 | Wee et al. | |
| 7,571,489 B2 * | 8/2009 | Ong et al. | 726/29 |
| 7,752,652 B2 * | 7/2010 | Prokupets et al. | 726/2 |
| 7,801,918 B2 * | 9/2010 | Iwase | 707/785 |
| 7,823,187 B2 * | 10/2010 | Tanaka et al. | 726/1 |
| 7,934,101 B2 * | 4/2011 | Stieglitz et al. | 713/183 |
| 2001/0019614 A1 | 9/2001 | Madoukh | |
| 2001/0037388 A1 | 11/2001 | Suzuki | |
| 2002/0002678 A1 | 1/2002 | Chow et al. | |
| 2002/0007461 A1 | 1/2002 | Garrison | |
| 2002/0023227 A1 | 2/2002 | Sheymov et al. | |
| 2002/0039420 A1 | 4/2002 | Shacham et al. | |
| 2002/0066038 A1 | 5/2002 | Mattsson et al. | |
| 2002/0078386 A1 | 6/2002 | Bones et al. | |
| 2002/0099946 A1 | 7/2002 | Herbert et al. | |
| 2002/0174352 A1 | 11/2002 | Dahl | |
| 2003/0061495 A1 | 3/2003 | Minnick | |
| 2003/0101355 A1 | 5/2003 | Mattsson | |
| 2003/0149883 A1 | 8/2003 | Hopkins et al. | |
| 2003/0187935 A1 | 10/2003 | Agarwalla et al. | |
| 2004/0267893 A1 | 12/2004 | Lin | |
| 2005/0015626 A1 | 1/2005 | Chasin | |
| 2005/0132192 A1 * | 6/2005 | Jeffries et al. | 713/169 |
| 2006/0179296 A1 | 8/2006 | Bartlett et al. | |
| 2007/0067637 A1 | 3/2007 | Mattsson et al. | |
| 2007/0168678 A1 * | 7/2007 | Meenakshisundaram | 713/189 |
| 2008/0022136 A1 | 1/2008 | Mattsson et al. | |
| 2008/0052755 A1 | 2/2008 | Pham et al. | |
| 2010/0031321 A1 * | 2/2010 | Mattsson | 726/4 |

FOREIGN PATENT DOCUMENTS

| | | |
|---|---|---|
| EP | 0999490 A2 | 5/2000 |
| EP | 1207443 A2 | 5/2002 |
| EP | 1207462 A2 | 5/2002 |
| EP | 1209550 A2 | 5/2002 |
| EP | 1211589 | 6/2002 |
| EP | 1211589 A2 | 6/2002 |
| EP | 1315065 A1 | 5/2003 |
| GB | 2242295 A | 9/1991 |
| GB | 2248951 A | 4/1992 |
| SE | 524 522 C2 | 8/2004 |
| WO | WO 93/11619 A1 | 6/1993 |
| WO | WO 95/15628 A1 | 6/1995 |
| WO | WO 95/22792 A1 | 8/1995 |
| WO | WO 97/49211 | 12/1997 |
| WO | WO 97/49211 A1 | 12/1997 |
| WO | WO 98/17039 A1 | 4/1998 |
| WO | WO 01/35226 A1 | 5/2001 |
| WO | WO 03/044638 A1 | 5/2003 |

OTHER PUBLICATIONS

Bruce Schneier, "Applied Cryptography", pp. 30-31 and 351-354 (2d ed. 1996).

Bernd Bruegge and Allen H. Dutuoit, "Object-Oriented Software Engineering", § 6.3 (2000).

International Search Report mailed on Sep. 24, 2008 in PCT/SE2008/050704.

Archive of "Protegrity History," [online] [Archived by http://archive.org on Apr. 11, 2001; Retrieved on Feb. 7, 2013] Retrieved from the Internet<http://web.archive.org/web/20010411000157/http://www.protegrity.com/History.html>.

Bhattacharyya, R.K., "Security of Network Element Databases Against Increasing Threats of Intrusion Via Operations Interfaces,"

Proceedings of the International Carnahan Conference on Security Technology: Crime Countermeasures, Oct. 5-7, 1988, New York IEEE US Oct. 5, 1988, pp. 51-64, C1988-10-05.

Denning, D.E., "An Intrusion-Detection Model" IEEE Transactions on Software Engineering, IEEE Inc., New York, US, Feb. 1, 1987, pp. 222-232, vol. SE-13, No. 2.

Lindemann, M. et al., "Improving DES Coprocessor Throughput for Short Operations," Proceedings of the 10$^{th}$ USENIX Security Symposium, Aug. 13-17, 2001, USENIX Association, pp. 67-81.

Mattsson, U., "Information Security and Privacy for Your Global E-Business," Protegrity, Inc., Jan. 11, 2000, 14 pages, [Online] [Retrieved on Jul. 17, 2001] Retrieved from the Internet<URL:http://www.protegrity.com/pdf/SD_transON:WP.pdf>.

Pfleeger, C.P., "Security in Computing", Second Edition, Prentice-Hall, Inc., 1997, (Section 8.7 Proposals for Multilevel Security), pp. 364-372.

Schacham, H. et al., "Improving SSL Handshake Performance Via Batching," Lecture Notes in Computer Science, 2001, Stanford University, pp. 1-15.

"Security Requirements for Cryptographic Modules," FIPS PUB 140-2, May 25, 2001, Federal Information Processing Standards Publication, 69 pages.

Smirni, E. et al., "Evaluation of Multiprocessor Allocation Policies," pp. 1-21 Published 1993.

Snapp, S.R. et al., "A System for Distributed Intrusion Detection," IEEE, 1991, pp. 170-176.

"Structure for Security Administration," Software Patent Institute Database of Software Technologies, Nov. 1978, 3 pages, [Online] [Retrieved on Jul. 18, 2001] Retrieved from the Internet<URL:http://m.spi.org/cgi-bin/newqry>.

Swedish Office Action, Swedish Application No. 0004375-2, Jul. 25, 2001, 6 pages.

PCT International Search Report, PCT International Application No. PCT/EP02/13067, Feb. 24, 2003, 3 pages.

PCT Written Opinion, PCT Application No. PCT/SE2008/050704, Sep. 24, 2008, 6 pages.

PCT International Preliminary Report on Patentability, PCT Application No. PCT/SE2008/050704, Dec. 11, 2009, 7 pages.

PCT International Search Report, PCT Application No. PCT/SE2008/050704, 4 pages.

PCT International Search Report, PCT Application No. PCT/US06/06057, 3 pages.

PCT Written Opinion, PCT Application No. PCT/US06/06057, 3 pages.

PCT International Preliminary Report on Patentability, PCT Application No. PCT/US2006/006057, Aug. 30, 2007.

U.S. Appl. No. 11/644,106, filed Dec. 21, 2006.

U.S. Appl. No. 09/712,926, filed Nov. 16, 2000, Inventors: Mattsson et al.

U.S. Appl. No. 09/840,188, filed Apr. 24, 2001, Inventor: Dahl.

U.S. Appl. No. 09/925,503, filed Aug. 10, 2001, Inventors: Sheymov et al.

U.S. Appl. No. 11/252,303, filed Oct. 17, 2005, Inventors: Bartlett et al.

U.S. Appl. No. 11/357,351, filed Feb. 17, 2006, Inventor: Mattsson.

U.S. Appl. No. 11/357,926, filed Feb. 17, 2006, Inventors: Mattsson et al.

U.S. Appl. No. 11/540,467, filed Sep. 29, 2006, Inventors: Mattsson et al.

U.S. Appl. No. 11/603,967, filed Nov. 21, 2006, Inventor: Dahl.

U.S. Appl. No. 60/848,251, filed Sep. 29, 2006, Inventor: Mattsson.

U.S. Appl. No. 60/654,367, filed Feb. 18, 2005, Inventor: Mattsson.

U.S. Appl. No. 11/540,433, filed Sep. 29, 2006, Inventor: Mattsson.

U.S. Appl. No. 11/374,341, filed May 2000, Inventor: Geary.

* cited by examiner

METHOD AND SYSTEM FOR PREVENTING IMPERSONATION OF A COMPUTER SYSTEM USER

CROSS-REFERENCE TO RELATED APPLICATIONS

This application is a National Phase entry of PCT Application No. PCT/SE2008/050704, filed on Jun. 11, 2008, which claims priority under 35 U.S.C. §119(e), 120 and 365(c) to U.S. Provisional Application No. 60/934,128, filed on Jun. 11, 2007, in the U.S. Patent and Trademark Office.

RELATED APPLICATIONS

The present application relates, but does not claim priority to, U.S. patent application Ser. No. 09/725,005, filed Nov. 29, 2000 and published as U.S. Patent Publication No. 2002/0066038 on May 30, 2002, and U.S. patent application Ser. No. 11/374,341, filed Mar. 13, 2006 and published as U.S. Patent Publication No. 2007/0067637 on Mar. 22, 2007, both of which are incorporated herein in their entirety.

TECHNICAL FIELD

The present invention relates to a method and a system for preventing an administrator of a computer system from impersonating a user.

BACKGROUND INFORMATION

In order to protect information stored in a database, it is known to store sensitive data encrypted in the database. To access the encrypted data, the data must be decrypted, which can only be done by knowing the encryption algorithm and the specific decryption key being used. Access to the decryption keys can be limited to certain users of the database system, and further, different users could be given different access rights.

Specifically, it is preferred to use a so-called granular security solution for the encryption of databases, instead of building walls around servers or hard drives. In such a solution, which is described in WIPO Publication No. WO 97/49211, published on Dec. 24, 1997, a protective layer of encryption is provided around specific sensitive data-items or objects. This prevents outside attacks as well as infiltration from within the server itself. This also allows the system administrator to define which data stored in databases are sensitive and thereby focusing the protection only on the sensitive data, which in turn minimizes the delays or burdens on the system that may occur from other bulk encryption methods.

Most preferably, the encryption is made on such a basic level as in the column level of the databases. Encryption of whole files, tables or databases is not very granular, and thus encrypts both sensitive and non-sensitive data. It is further possible to assign different encryption keys of the same algorithm to different data columns. With multiple keys in place, intruders are prevented from gaining full access to any database since a different key could protect each column of encrypted data.

Such a security solution provides separation of the duties of a security administrator (SA) from a database administrator (DBA). The DBA's role could for example be to perform usual DBA tasks, such as extending tablespaces etc., without being able to see (decrypt) sensitive data. The SA could then administer privileges and permissions, for instance add or delete users.

For most commercial databases, the database administrator has privileges to access the database and perform most functions, such as changing password of the database users, independent of the settings by the system administrator. An administrator with root privileges could also have full access to the database. This is an opening for an attack where the DBA can steal all the protected data without any knowledge of the protection system above if the DBA impersonates another user by manipulating that user's password, even though the user's password is enciphered by a hash algorithm.

An attack could proceed as follows. First the DBA logs in as himself then the DBA reads the hash value of the user's password and stores this separately. Preferably the DBA also copies all other relevant user data. By these actions the DBA has created a snapshot of the user before any altering. Then the DBA executes the command "ALTER USER username IDENTIFIED BY newpassword". The next step is to log in under the user name "username" with the password "newpassword" in a new session. The DBA then resets the user's password and other relevant user data with the previously stored hash value.

The risk of a DBA attack is further exacerbated by the increased outsourcing of information technology administration. While a company may achieve cost savings by delegating routine management of databases, file systems, etc., a subcontractor is likely trusted less than an internal employee, especially where the subcontractor resides in an unfamiliar legal jurisdiction. Companies recognizing this risk are increasing focused on the separation of duties concept under which system administrators such as DBAs have the ability to perform routine maintenance tasks, while a Security Administrator (SA), often at a high management level, regulates access to sensitive resources. For at least these reasons, it is desirable to provide a system and method of limiting a DBA's ability to access sensitive resources, especially by impersonating a user in an attempt to gain access to the contents of the database.

SUMMARY OF THE INVENTION

A first embodiment of the invention is directed to a method of changing a user password on a target system. The method comprises: receiving a first request from a user to change the user's password on a target system to be changed, sending a "change password" request for the user to the target system, storing the user's new password, receiving a second request from the target system on behalf of the user for access to a sensitive resource, and denying the second request if the information about the user's password is not consistent with the user's stored new password. The second request contains information about the user's password.

The embodiment may include various features. For example, the method may include authenticating the first user. Information about the user's password may include the user's password in plain text, the user's password in encrypted text, and/or a hash value of the user's password. The sensitive resource may include encrypted data The target system may be a database, a file system, an application, a network, and/or a data at rest system.

Another embodiment of the invention is directed to a computer-readable medium whose contents cause a computer to perform a method of changing a user password on a target system by the steps of receiving a first request from a user to change the user's password on a target system to be changed, sending a "change password" request for the user to the target system, storing the user's new password, receiving a second request from the target system on behalf of the user for access to a sensitive resource, and denying the second request if the information about the user's password is not consistent with the user's stored new password. The second request contains information about the user's password.

Another embodiment of the invention is directed to a system for preventing an administrator from impersonating a user of a target system, the system comprising: an access control system comprising a computer readable medium comprising instructions to execute the method of claim 1, and the target system comprising sensitive data. User requests to the target system for sensitive resources are sent to the access control system for authentication.

DESCRIPTION

Figure 1:
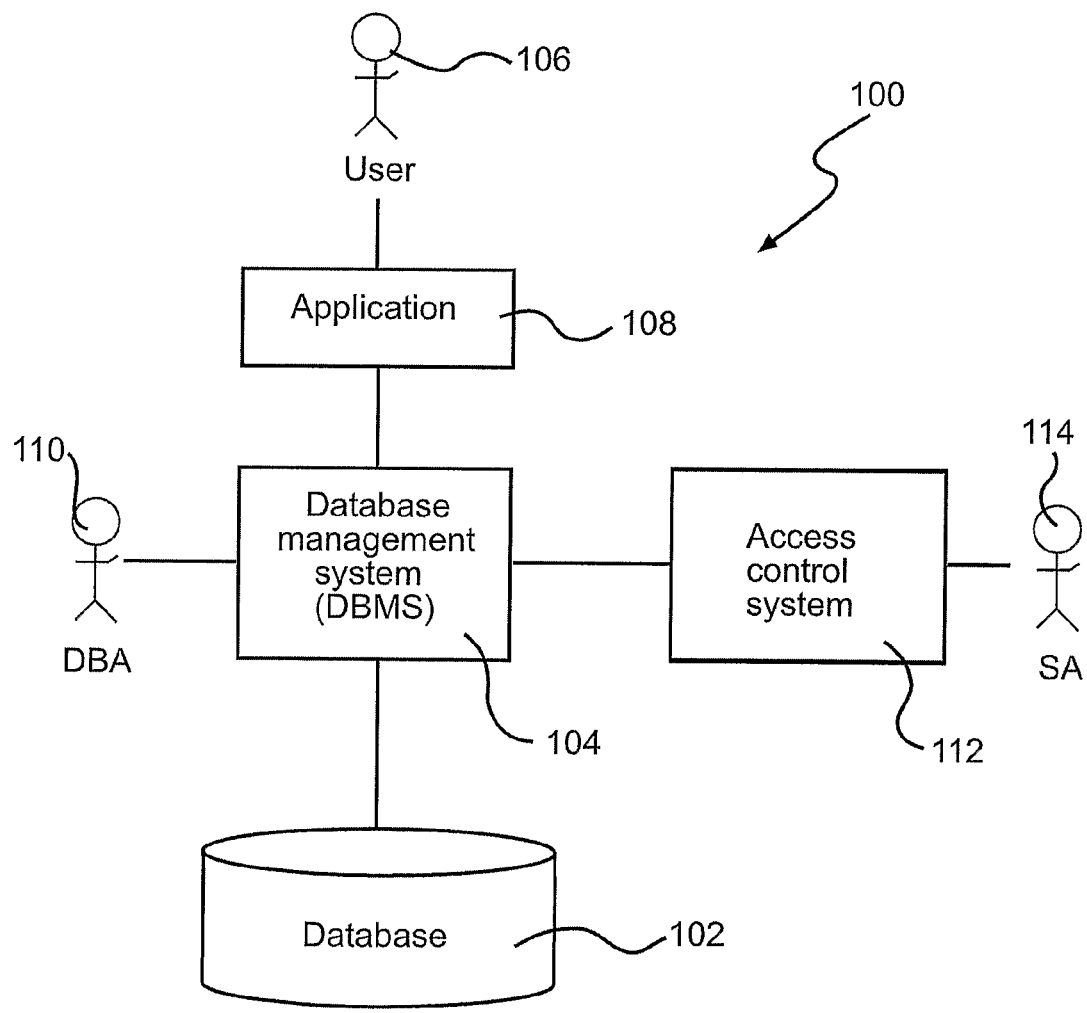
FIG. 1 is a schematic view of one of many systems in which the invention might be implemented.

Referring to FIG. 1, a schematic view 100 of the components in a granular protection system of a database are shown. In this example, the central repository of the data is a relational database 102. An example of such a database is OracleBe, available from Oracle Int'l Corp of Redwood City, Calif. The data is stored in tables, which are interrelated with each other and the tables comprise columns and rows. The database 102 can also hold other information such as information about the structure of the tables, data types of the data elements, constraints on contents in columns, user data such as password, etc.

The database 102 is operated through a database management system (DBMS) 104. A DBMS 104 is imposed upon the data to form a logical and structured organization of the data A DBMS 104 lies between the physical storage of data and the users 106 and handles the interaction between the two. Examples of DBMSes 104 include DB2® and Informix® both available from IBM Corp. of Armonk, N.Y.; Microsoft Jet® and Microsoft SQL Server® both available from the Microsoft Corp. of Redmond, Wash.; MySQL® available from the MySQL Ltd. Co. of Stockholm, Sweden; Oracle® Database, available from Oracle Int'l Corp of Redwood City, Calif.; and Sybase® available from Sybase, Inc. of Dublin, Calif.

A user 106 normally does not operate the DBMS 104 directly. Rather, the user 106 uses an application 108 which in turn operates with the DBMS 104. Maintenance work is performed by a database administrator (DBA) 110, who has direct access to the DBMS 104. An administrator 110 is a role with certain privileges given to a person, i.e. a special kind of user. For instance, the privileges can include permissions to add new users 106 or read data, and normally the administrator 110 is allowed to unrestricted use of the database 102. Thus, an administrator 110 is allowed to manipulate data, and manage users 106 and other operating tasks of a database 102. A user 106, in contrast to an administrator 110, is normally only allowed to manipulate the actual data in the database 102, and often only some of the data. Which data a user 106 can manipulate is regulated by the user's 106 permissions, which are set by the administrator 110.

In order to protect the data in the database 102, an access control system (ACS) 112 interacts with the DBMS 104 in order to protect data from being exposed to users lacking the necessary rights. The access control system 112 (e.g., a Secure.Data™ and/or a DEFIANCE™ DPS, available from Protegrity Corp. of Stamford, Conn.) provides encryption and decryption of data, authentication of users 106 and means for a security administrator (SA) 114 to provide different users 106 or user groups with different privileges to access data. The SA 114 has the role of defining which users 106 have access to which data.

Thus, a user 106 accesses the database 102 through an application 108, which in turn uses the DBMS 104 to access the database 102. During the access, the ACS 112 interacts in real time with the DBMS 104 to permit or deny the access attempt. But, a DBA 110 will always have access to the database 102 and/or DBMS 104. In order to protect sensitive information from the DBA 110, sensitive data is encrypted by the ACS 112. But, there is risk that the DBA 110 would impersonate a user 106 in order to gain access to decrypted data. The invention described herein prevents the DBA 110 from impersonating a user 106 in order to gain access to encrypted data.

The invention herein prevents the DBA 110 or other administrator from accessing sensitive resources, such as encrypted data, by comparing a user's 106 DBMS 104 password information with a stored DBMS 104 password for the user maintained by the ACS 112. While the DBA 110 still has the power to make unauthorized changes to user's 106 password, the DBA 110 cannot leverage the now-compromised password to access encrypted information because the DBMS 104 will send password information to the ACS 112 when requesting decryption of the encrypted data. The ACS 112 will detect that the password information does not match the password stored by the ACS 112 and reject the request.

While the database architecture as described in FIG. 1 will be used throughout the application as an example, the invention described herein is in no way limited to database architectures. Rather, the invention herein may be applied to secure a variety of target systems including, but not limited to, databases, file systems (including file servers, network attached storage (NAS) devices, and storage area networks (SAN)), applications, networks, and data at rest systems. A "data at rest system" is defined broadly to include any system or device for storing and providing access to data and/or information, persistently or otherwise, now known or later developed.

Figure 2:
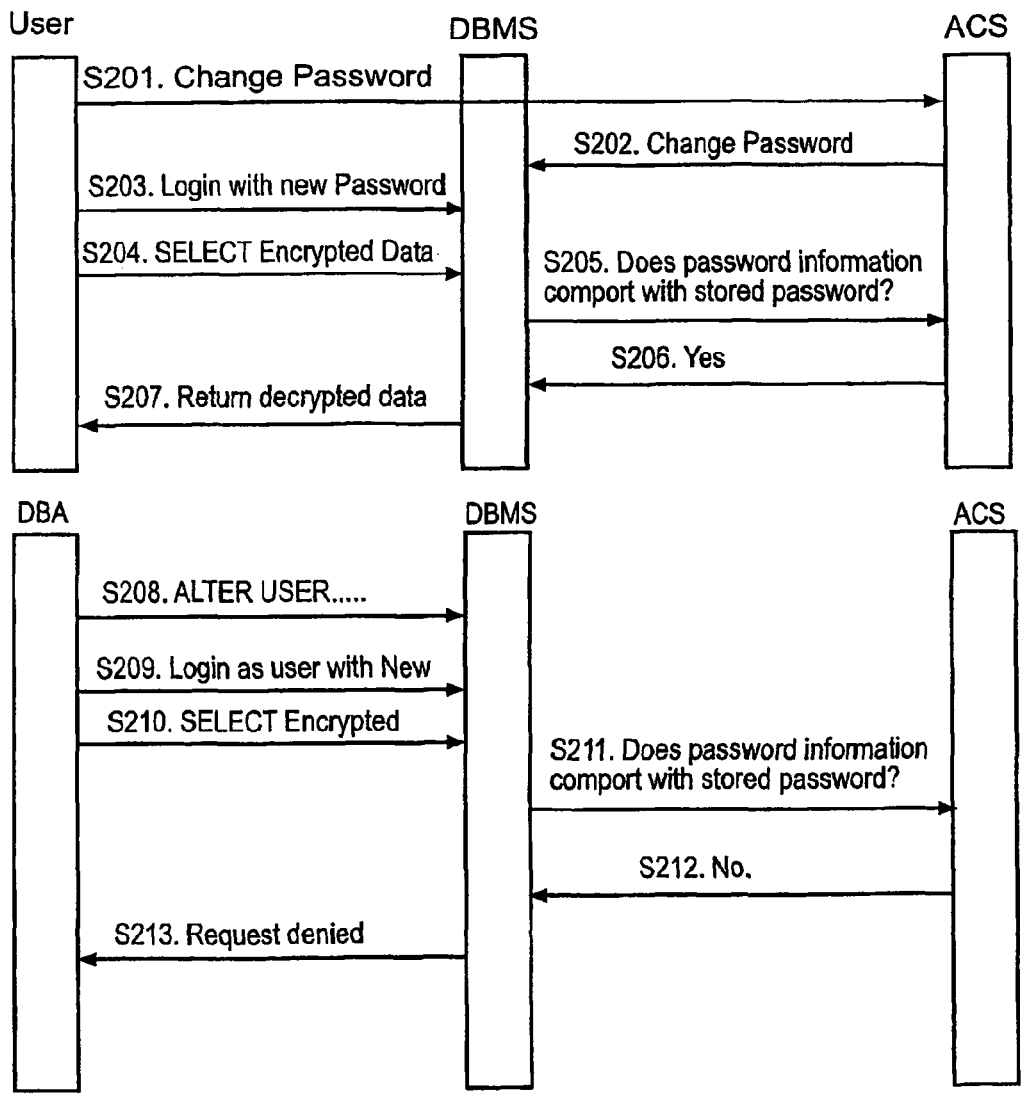
FIG. 2 is a sequence diagram depicting operation of the invention for authorized and unauthorized users.

Referring now to FIG. 2, a sequence diagram illustrates an embodiment of the invention described herein. Vertical bars represent a user 106, a DBA 110, a DBMS 104, and an ACS 112. All bars are abstractions of the entities depicted. For example, while a user 106 may initiate a password change, the actual communication to the ACS 112 will likely be facilitated an application 108 by the user's 106 computer.

The top half of FIG. 2 shows how an authorized password change is processed according to the invention herein. In step S201, the user 106 sends a change password request to the ACS 112. In some embodiments, the ACS 112 may require that the user 106 is authenticated and/or authorized before proceeding to step S202.

Authentication can be accomplished by examining one or more credentials from the following categories: something the user/client is (e.g. fingerprint or retinal pattern, DNA sequence, signature recognition, other biometric identifiers, or Media Access Control (MAC) address), something the user/client has (e.g. ID card, security token, or software token), and something the user/client knows (e.g. password, pass phrase, or personal identification number (PIN)). Authorization is a process of determining whether the authenticated user/client is allowed to view information or perform actions. The concepts of authentication and authorization are well known and thus not further described herein.

In step S202, the ACS 112 changes the password on the DBMS 104. The mechanics of changing the password are system specific, but familiar to programmers of a particular DBMS 104 or other system. For example, the ACS may execute an ALTER USER command in a SQL DBMS 104. As another example, if the target system is a Linux box, the ACS 112 may use the command password to change a users password. The ACS maintains a record of the user's 106 new login information.

At step S203, the user logs in to the DBMS with their new password. At step S204, the user 106 accesses a sensitive resource. In this example, the sensitive resource is encrypted data, which the user 106 requests with a SELECT query. At step S205, the DBMS 104 communicates with the ACS 112 to authenticate the user 106. The DBMS 104 transmits information about the user's 106 password to the ACS. The ACS 112 compares this information about the user's password to the password stored for the user 106. If the information is consistent with the stored password, the user is authenticated.

The amount of information about the user's 106 password transmitted in step S205 may vary in different embodiments of the invention. The entire password may be transmitted, either in plain text or encrypted. Alternatively, a hash of the password may be transmitted. A hash function is a function h: $U \rightarrow \{0, 1, 2, \ldots, N-1\}$, wherein U is an input (in this case a password). The hash function computes an integer N for every password U. In an efficient hash function (also known as collision-free), h will produce hash values N such that the number of passwords which produce the same hash value N is low, if not zero. Hash functions are well known and are described further in Giles Brassard and Paul Bratley, *Fundamentals of Algorithms* 160-61 (1996), and Bruce Schneier, *Applied Cryptography* 30-31, 351-54 (2d ed. 1996), the contents of which are hereby incorporated herein by reference. A simple hash involves XORing the password with a known string. More sophisticated methods exist and are describe in Schneier.

To verify the password, the DBMS 104 may communicate information about the password other than a hash. For example, the DBMS 104 may communicate the character in the password with the highest and/or lowest ASCII value, the sum of the ASCII values for each character in the password, the average ASCII value of each character in the password, the character/ASCII value of a defined character position in the password, and/or the length of the password.

The ACS 112 informs the DBMS that user 106 is authenticated in step S206. In some embodiments, the ACS 112 also communicates encryption keys or de-encrypted data to the DBMS. In other embodiments, the ACS may verify authentication and/or provide encryption keys to encryption/de-encryption means such as those described in U.S. patent application Ser. No. 11/644,106, filed on Dec. 21, 2006, the contents of which are hereby incorporated by reference herein. In step S207, the user 106 receives access to the sensitive resource, in this case, the decrypted data.

The bottom half of FIG. 2 shows how the invention herein protects against attempts by a DBA 110 to impersonate a user 106. Note that in the bottom half of FIG. 2, the left column represents the DBA 110, who masquerades as a user 106 after step S208. In step S208, the DBA 110 modifies the user's 106 password. This step includes any command and/or script to alter a user's 106 password on a system such as ALTER USER on a SQL DBMS 104 and password on a Linux system.

In step S209, the DBA 110 uses the now-changed password to login to the DBMS 104 as a user 106. In step S210, the DBA 110, masquerading as a user 106, requests access to a sensitive resource, in this example, encrypted data The DBA 110 has access to the encrypted data by nature of the compromised password. However, the data is of little use to the DBA 110 because it is encrypted. In order to decrypt the data, the DBMS 104 communicates with the ACS 112 to authenticate the user 106 (step S211). The DBMS 104 sends the user's 106 DBMS login and password to the ACS 112. The ACS 112 detects that the user's 106 password does not match the stored password for the user 106 and alerts the DBMS 104 that the user 106 is not authenticated (step S212). The request is accordingly denied by the DBMS 104 (step S213).

Accordingly, systems and methods for preventing an administrator from impersonating a user are provided. By incorporating accepted software engineering principles such as high coherence and low coupling, see, e.g., Bernd Bruegge & Allen H. Dutuoit, *Object-Oriented Software Engineering* §6.3 (2000), the invention can be easily implemented with minimal changes to the DBMS 104 or ACS 112. Moreover, the invention does not require the use of triggers when implemented in a DBMS 104, and therefore is not vulnerable to a DBA 110 disabling the triggers that detect intrusions. The DBA 110 does not have access to the ACS 112 and therefore cannot gain meaningful access to sensitive resources unless the DBA 110 is authorized.

The functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, computers, clients, servers and the like) shown as distinct for purposes of illustration may be incorporated within other functional elements, separated in different hardware or distributed in a particular implementation.

While certain embodiments according to the invention have been described, the invention is not limited to just the described embodiments. Various changes and/or modifications can be made to any of the described embodiments without departing from the spirit or scope of the invention. Also, various combinations of elements, steps, features, and/or aspects of the described embodiments are possible and contemplated even if such combinations are not expressly identified herein.

What is claimed is:

1. A method of changing a user password on a target system, the method comprising:
   receiving a first request from a user at an access control system to change a user password of the user for a target system to a new password;
   storing at the access control system the new password;
   changing, by the access control system, the user password on the target system to the new password;
   receiving, at the access control system, a second request from the target system to grant access to a sensitive resource at the target system to the user, the second request responsive to a prior request received at the target system from the user for access to the sensitive resource, the prior request including an input user password and wherein the second request includes information associated with the input user password;
   comparing, by the access control system, the information associated with the input user password and the stored new password; and
   responsive to a determination by the access control system that the information associated with the input user password is not consistent with the stored new password, denying access to the sensitive resource to the user.

2. The method of claim 1, further comprising:
authenticating, by the access control system, the identity of the user prior to changing the user password on the target system.

3. The method of claim 2, wherein authenticating the identity of the user comprises:
receiving, from the user at the access control system, a second user password for the access control system; and
determining whether the user is authorized to change the user password at the target system based on the received second user password.

4. The method of claim 1, wherein the information associated with the input user password comprises the input user password in plain text.

5. The method of claim 1, wherein information associated with the input user password comprises the input user password in encrypted text.

6. The method of claim 1, wherein information associated with the input user password comprises a hash value of the input user password.

7. The method of claim 1, wherein the sensitive resource is encrypted data.

8. The method of claim 1, wherein the target system is a database.

9. The method of claim 1, wherein the target system is a file system.

10. The method of claim 1, wherein the target system is an application.

11. The method of claim 1, wherein the target system is a network.

12. The method of claim 1, wherein the target system is a data at rest system.

13. The method of claim 1, further comprising:
responsive to a determination by the access control system that the information associated with the input user password is consistent with the stored new password, granting access to the sensitive resource to the user.

14. The method of claim 13, wherein the sensitive resource at the target system comprises data stored at the target system, and further comprising:
encrypting, by the access control system, the data stored at the target system.

15. The method of claim 14, wherein granting access to the sensitive resource comprises transmitting an encryption key to the target system.

16. The method of claim 14, wherein granting access to the sensitive resource comprises decrypting, by the access control system, the encrypted data.

17. A non-transitory computer-readable medium whose contents cause a computer to perform a method of changing a user password on a target system by the steps of:
receiving a first request from a user at an access control system to change a user password of the user for a target system to a new password;
storing at the access control system the new password;
changing, by the access control system, the user password on the target system to the new password;
receiving, at the access control system, a second request from the target system to grant access to a sensitive resource at the target system to the user, the second request responsive to a prior request received at the target system from the user for access to the sensitive resource, the prior request including an input user password and wherein the second request includes information associated with the input user password;
comparing, by the access control system, the information associated with the input user password and stored new password; and
responsive to a determination by the access control system that the information associated with the input user password is not consistent with the stored new password, denying access to the sensitive resource to the user.

18. A system for changing a user password on a target system, the system comprising:
a non-transitory computer-readable storage medium storing executable computer program instructions comprising instructions for:
receiving a first request from a user to change a user password of the user on a target system server to a new password;
storing the new password;
receiving a second request from the target system server to grant access to a sensitive resource at the target system to the user, the second request responsive to a prior request received at the target system from the user for the sensitive resource, the prior request including an input user password and wherein the second request includes information associated with the input user password;
comparing the information associated with the input user password and stored new password; and
responsive to a determination that the information associated with the input user password is not consistent with the stored new password, denying access to the sensitive resource to the user; and
a processor for executing the computer program instructions.

* * * * *